(12) United States Patent
Lee

(10) Patent No.: US 7,583,332 B2
(45) Date of Patent: Sep. 1, 2009

(54) COLOR-FILTERLESS LIQUID CRYSTAL DISPLAY DEVICE

(75) Inventor: Seok-Iyul Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 173 days.

(21) Appl. No.: 11/923,175

(22) Filed: Oct. 24, 2007

(65) Prior Publication Data
US 2009/0015756 A1    Jan. 15, 2009

(30) Foreign Application Priority Data
Jul. 10, 2007    (TW) .............................. 96125137 A

(51) Int. Cl.
G02F 1/13357    (2006.01)

(52) U.S. Cl. .............................. 349/68; 349/65; 349/95; 362/612; 362/613

(58) Field of Classification Search .................. 349/57, 349/61, 65, 68, 69, 95, 96; 362/27, 601, 362/612, 613, 616, 621, 625, 626; 359/619; 345/102
See application file for complete search history.

(56) References Cited

U.S. PATENT DOCUMENTS

| | | | |
|---|---|---|---|
| 6,151,166 A | 11/2000 | Matsushita et al. | |
| 6,750,931 B2 | 6/2004 | Satake et al. | |
| 6,791,636 B2* | 9/2004 | Paolini et al. | 349/61 |
| 6,791,639 B2 | 9/2004 | Colgan et al. | |
| 6,839,108 B1 | 1/2005 | Hirakata et al. | |
| 6,987,036 B2 | 1/2006 | Hamatani et al. | |
| 7,001,829 B1 | 2/2006 | Yamazaki | |
| 7,031,064 B2 | 4/2006 | Kitamura et al. | |
| 7,042,637 B2 | 5/2006 | Mukawa et al. | |
| 2004/0189588 A1 | 9/2004 | Dong et al. | |
| 2004/0246275 A1* | 12/2004 | Yoshihara et al. | 345/690 |
| 2005/0041174 A1 | 2/2005 | Numata et al. | |
| 2005/0254127 A1* | 11/2005 | Evans et al. | 359/497 |
| 2007/0097066 A1* | 5/2007 | Ward | 345/102 |
| 2008/0094329 A1 | 4/2008 | Roosendaal | |

FOREIGN PATENT DOCUMENTS

| | | |
|---|---|---|
| CN | 1985212 A | 6/2007 |
| JP | 2003035904 | 2/2003 |
| TW | I265355 | 11/2006 |

* cited by examiner

Primary Examiner—Dung Nguyen
Assistant Examiner—Tai Duong
(74) Attorney, Agent, or Firm—Kirton & McConkie; Evan R. Witt

(57) ABSTRACT

A color-fliterless liquid crystal display device includes a plurality of pixel units, each pixel unit includes a first sub-pixel and a second sub-pixel. The liquid crystal display device includes a plurality of light sources, each for emitting light having various wavelength ranges. A guide plate contains a first reflective surface and a second reflective surface for guiding light having various wavelength ranges toward the first and second sub-pixels. Accordingly, various gray levels shown by each pixel unit are combined by the two sub-pixels based on the light having various wavelength ranges

26 Claims, 4 Drawing Sheets

COLOR-FILTERLESS LIQUID CRYSTAL DISPLAY DEVICE

BACKGROUND OF THE INVENTION

1. Field of the Invention

The present invention relates to a liquid crystal display device, and more particularly, to a color-filterless liquid crystal display device with unchanged display quality.

2. Description of Related Art

With a rapid development of monitor types, novel and colorful monitors with high definition, e.g., liquid crystal displays (LCDs), are indispensable components used in various electronic products such as mobile phones, personal digital assistants, digital cameras, desktop computers and notebook computers.

FIG. 1 shows a schematic diagram of a conventional liquid crystal display device. The liquid crystal display device 10 is assembled by several main components, such as light sources 12 (e.g., cold cathode fluorescent lamps, hot cathode fluorescent lamps, and light emitting diodes), a reflector 14, a light guide plate 16, a diffusion sheet 18, a polarization film 20, and a liquid crystal cell 22. The liquid crystal cell 22 comprises a substrate 24, a color filter 26 and a plurality of pixels, and each pixel is composed of sub-pixels indicating three primary colors of red, green and blue, respectively.

The light guide plate 16 may, after receiving a light emitted from the light source 12, guide the light to scatter as a uniform area light. On the other hand, the reflector 14 positioned on one side of the light guide plate 16, reflects the light emitted toward itself back to the light guide plate 16, to avoid light leakage; thereby increasing the efficiency of emitted light. The light emitted from the light guide plate 16, after being uniform through the diffusion sheet 18 to enhance brightness and uniformity, is emitted into the liquid crystal cell 22. However, an alignment of the liquid crystal molecules corresponding to each sub-pixel within the liquid crystal cell 22, is varied based on the voltage provided by the driving chip, to adjust the luminous flux when light is passing through. Furthermore, the light emitted from the light source 12 is a monotonous white light, and thus the color filter 26 of the liquid crystal display device 10 includes the light filter regions 26a, 26b and 26c, corresponding to sub-pixels of three primary colors of red, green and blue, respectively, wherein light of various colors is generated after the light passes through the liquid crystal molecules.

The color filter is formed on a glass substrate by using organic materials of three primary colors of red, green and blue within each sub-pixel. However, the cost of color filters is the highest among those of all indispensable components for a liquid crystal display device. In such case, to reduce the use of color filters may be favorable to lower the total production cost of liquid crystal display devices.

SUMMARY OF THE INVENTION

Therefore, the present invention provides a color-filterless liquid crystal display device with unchanged display quality, so as to resolve the above-mentioned problem associated with the prior art.

According to the present invention, a liquid crystal display device comprises a plurality of pixel units, a first light source, a second light source, a third light source, a fourth light source, a light guide plate, and a plurality of condensing lenses. Each pixel unit comprises a first sub-pixel unit and a second sub-pixel unit. The first light source generates light with a first wavelength range. The second light source generates light with a second wavelength range. The third light source generates light with a third wavelength range. The fourth light source generates light with a fourth wavelength range. The light guide plate comprises a plurality of first grooves and a plurality of second grooves. Each first groove comprises a first reflective surface for guiding the light with the first wavelength range and the light with the third wavelength range, and each second groove comprises a second reflective surface for guiding the light with the second wavelength range and the light with the fourth wavelength range. The plurality of condensing lenses is disposed between the light guide plate and the plurality of pixel units. Each condensing lens is used for condensing the light with the first wavelength range and the light with the third wavelength range on the first sub-pixel, and for condensing the light with the second wavelength range and the light with the fourth wavelength range on the second sub-pixel.

According to the present invention, a liquid crystal display device comprises a plurality of pixel units, a first light source, a second light source, a third light source, a fourth light source, a first light guide plate, a second light guide plate, and a plurality of condensing lenses. Each pixel unit comprises a first sub-pixel unit and a second sub-pixel unit. The first light source generates light having a first wavelength range. The second light source generates light having a second wavelength range. The third light source generates light having a third wavelength range. The fourth light source generates light having a fourth wavelength range. The first light guide plate comprises a plurality of first grooves, and each first groove comprises a first reflective surface for guiding the light having the first wavelength range and the light having the third wavelength range. The second light guide plate comprises a plurality of second grooves, and each second groove comprises a second reflective surface for guiding the light having the second wavelength range and the light having the fourth wavelength range. The plurality of condensing lenses is disposed between the light guide plate and the plurality of pixel units. Each condensing lens is used for condensing the light having the first wavelength range and the light having the third wavelength range on the first sub-pixel, and for condensing the light having the second wavelength range and the light having the fourth wavelength range on the second sub-pixel.

The present invention will be described with reference to the accompanying drawings, which show exemplary embodiments of the present invention.

DETAILED DESCRIPTION OF THE INVENTION

Figure 1:
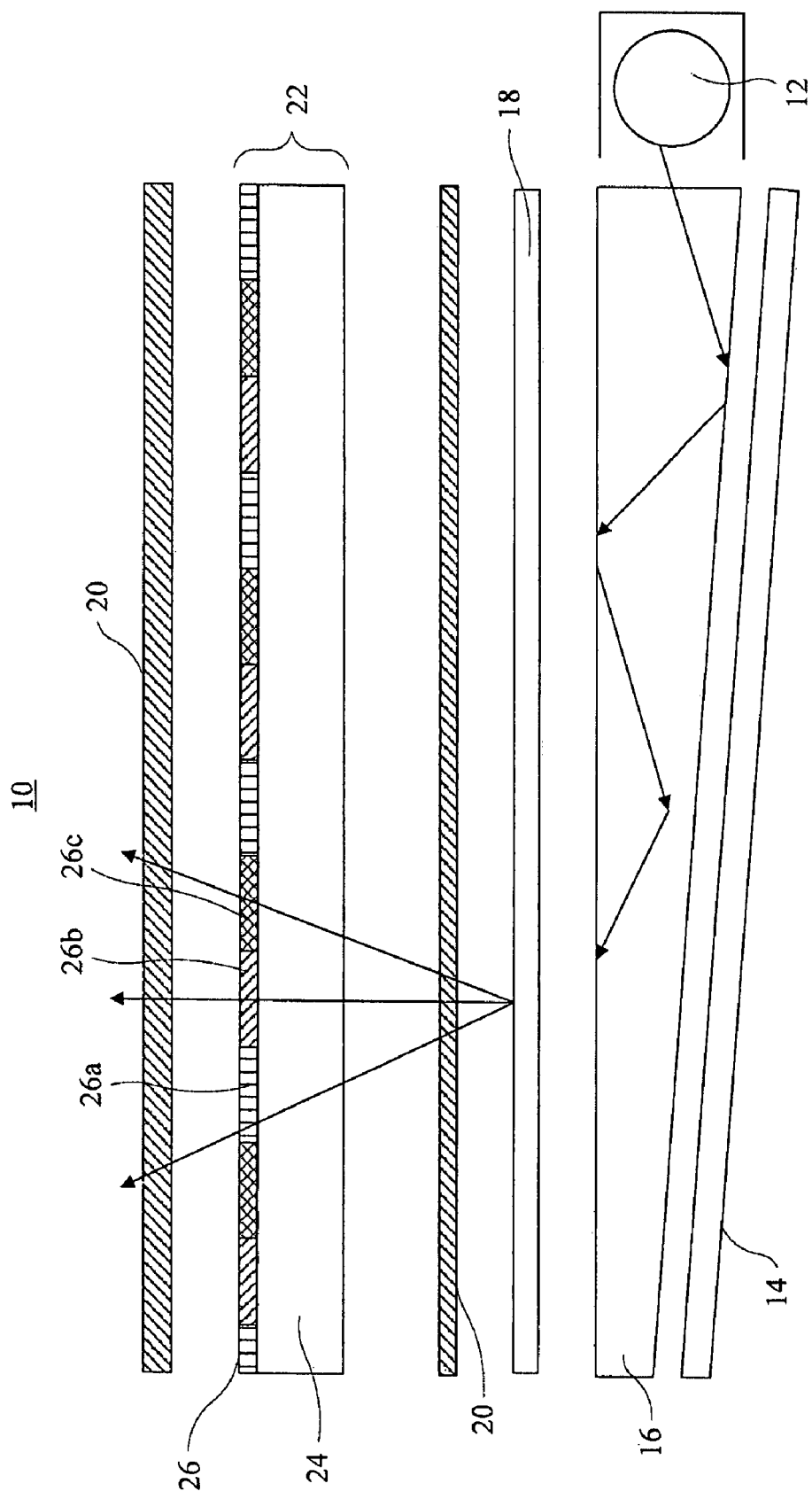
FIG. 1 shows a schematic diagram of a conventional liquid crystal display device.
Figure 2A:
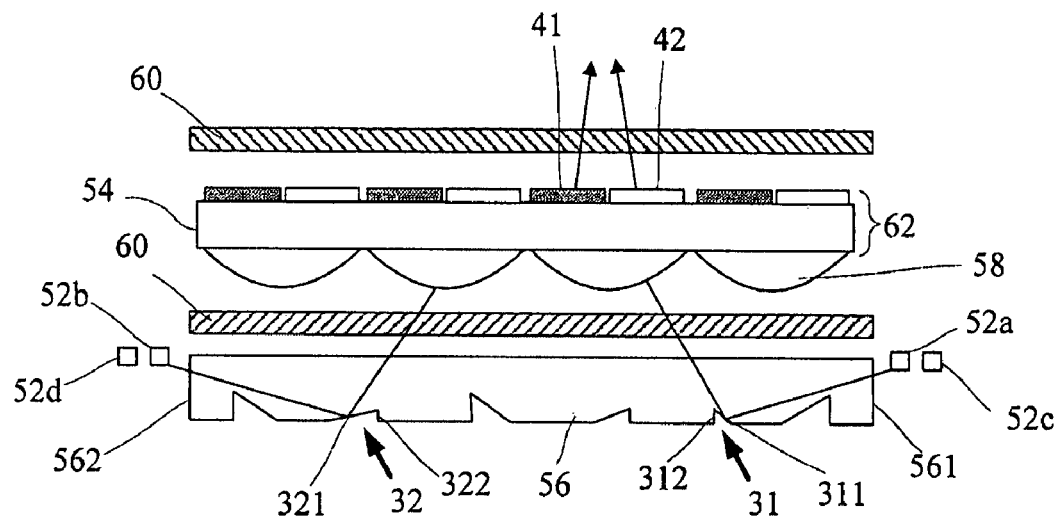
FIGS. 2A and 2B depict schematic diagrams of the operations of a liquid crystal display device in different periods according to a first embodiment of the present invention.
Figure 2B:
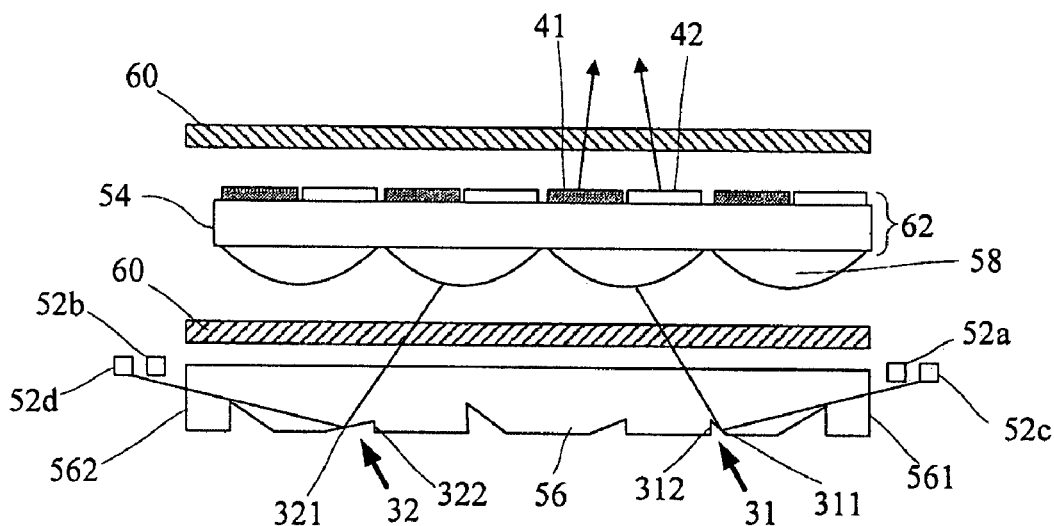

FIGS. 2A and 2B depict schematic diagrams of the operations of a liquid crystal display device in different periods according to a first embodiment of the present invention. The liquid crystal display device 100 comprises a first light source 52a, a second light source 52b, a third light source 52c, a fourth light source 52d, a first light guide plate 56a, a second light guide plate 56b, two polarization films 60, a plurality of condensing lens 58 and a liquid crystal cell 62. The liquid crystal cell 62 comprises a substrate 54 and a plurality of pixel units, each pixel unit, which contains a first sub-pixel 41 and a second sub-pixel 42, is corresponding to a condensing lens 58. The light guide plate 56 includes a first light entrance surface 561 and a second light entrance surface 562 located opposite to the first light entrance surface 561. The first light source 52a and the third light source 52c are closely disposed by the first light entrance surface 561, and the second light source 52b and the fourth light source 52d are closely disposed by the second light entrance surface 562. The first light source 52a generates a light having a first wavelength range; in this embodiment according to the present invention, the first light source 52a is a red light emitting diode, and thus the light having the first wavelength range is in accordance with that having the wavelength range of red light. The second light source 52b generates a light having the second wavelength range; in this embodiment according to the present invention, the second light source 52b is a blue light emitting diode, and thus the light having the second wavelength range is in accordance with that having the wavelength range of blue light. The third light source 52c generates a light having the third wavelength range; in this embodiment according to the present invention, the third light source 52c is a green light emitting diode, and thus the light having the third wavelength range is in accordance with that having the wavelength range of green light. The fourth light source 52d generates a light having the fourth wavelength range; in this embodiment according to the present invention, the fourth light source 52d is a yellow light emitting diode, and thus the light having the fourth wavelength range is in accordance with that having the wavelength range of yellow light. In another embodiment according to the present invention, the fourth light source 52d may be a white light emitting diode, and thus the light having the fourth wavelength range is also in accordance with that having the wavelength range of white light.

The light guide plate 56 comprises a plurality of first grooves 31 and a plurality of second grooves 32. Each first groove 31 contains a first reflective surface 311 and a first plane 312. An angle between the first plane 312 and the first reflective surface 311 is in the range of 15 to 45 degrees. Each second groove 32 contains a second reflective surface 321 and a second plane 322. An angle between the second plane 322 and the second reflective surface 321 is in the range of 15 to 45 degrees. Preferably, the directions of normal lines of the first reflective surface 311 and second reflective surface 321 are perpendicular to each other.

After entering the light guide plate 56, the red light or green light emitted from the first light source 52a or third light source 52c, respectively, may be guided to a uniform area light by the first reflective surface 311. Similarly, the blue light or yellow light emitted from the second light source 52b or fourth light source 52d, respectively, may be guided to a uniform area light by the second reflective surface 321. Next, the light emitted from the light guide plate 56, after passing through the polarization film 60, is polarized then emitted into the plurality of condensing lens 58. The plurality of condensing lens 58 is used for condensing light, such that the red and green light may be emitted toward the first sub-pixel 41, and the blue and yellow light may be emitted toward the second sub-pixel 42.

Figure 3:
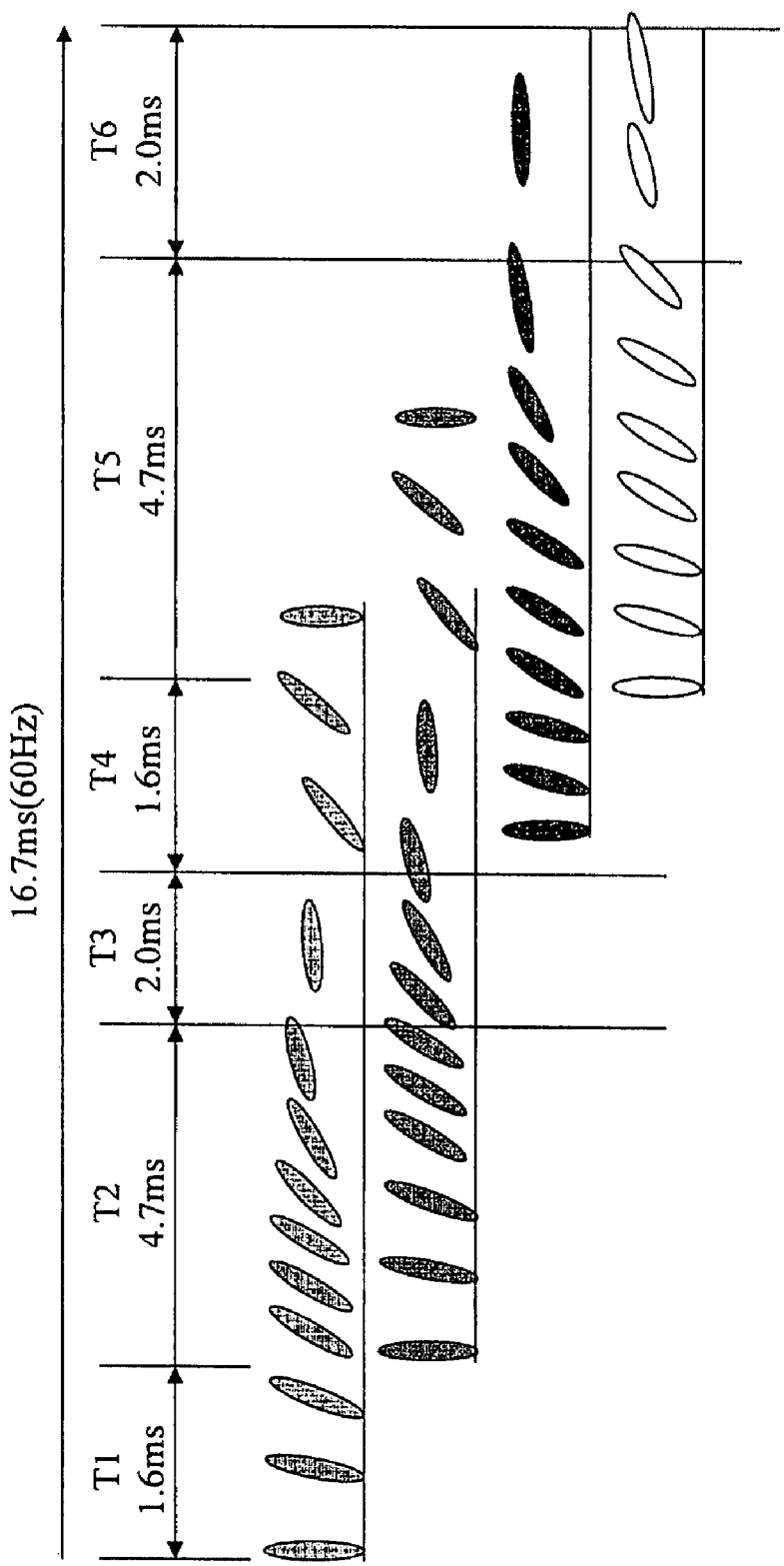
FIG. 3 shows a schematic diagram of the changing periods of liquid crystal molecules in response to the two sub-pixels of one pixel unit in one scanning period, according to the present invention.

Referring to FIGS. 2A, 2B and 3, FIG. 3 shows a schematic diagram of the changing period of liquid crystal molecules in response to the two sub-pixels 41, 42 of one pixel unit in one scanning period. For instance, a liquid crystal display device with the operating frequency of 60 Hz (that is 16.7 ms) is provided, each pixel unit renews data at every period of 16.7 ms.

In the period T1, a scanning signal voltage turns on transistors of the first sub-pixel 41, while the liquid crystal molecules start rotating based on the data signal voltage. In the T2 period, with the gradual rotation of liquid crystal molecules within the first sub-pixel 41, the scanning signal voltage turns on transistors of the second sub-pixel 42, while the liquid crystal molecules start rotating based on the data signal voltage. In the period T3, as illustrated in FIG. 2A, the first and second light sources 52a, 52b are turned on for generating red and blue lights, respectively. In such case, the first and second sub-pixels 41, 42, may, based on the alignment of liquid crystal molecules, show various gray levels. Next, in the period T4, the scanning signal voltage turns on the transistors of the first sub-pixel 41, while the liquid crystal molecules start rotating based on the data signal voltage. In the T5 period, with the gradual rotation of liquid crystal molecules within the first sub-pixel 41, the scanning signal voltage turns on the transistors of the second sub-pixel 42, while the liquid crystal molecules start rotating based on the data signal voltage. In the period T6, as illustrated in FIG. 2B, the third and fourth light sources 52c, 52d are turned on for generating green and yellow light, respectively. In such case, the first and second sub-pixels 41, 42 may, based on the alignment of liquid crystal molecules, show various gray levels.

As described above, in each scanning interval of every pixel unit (16.7 ms), various gray levels shown by each pixel unit are combined by the two sub-pixels 41 and 42, based on the light with various wavelength ranges generated from the light sources 52a-52d and alignment of liquid crystal molecules. The scanning time is extremely short, so there is no great difference of visual effect to users.

Figure 4A:
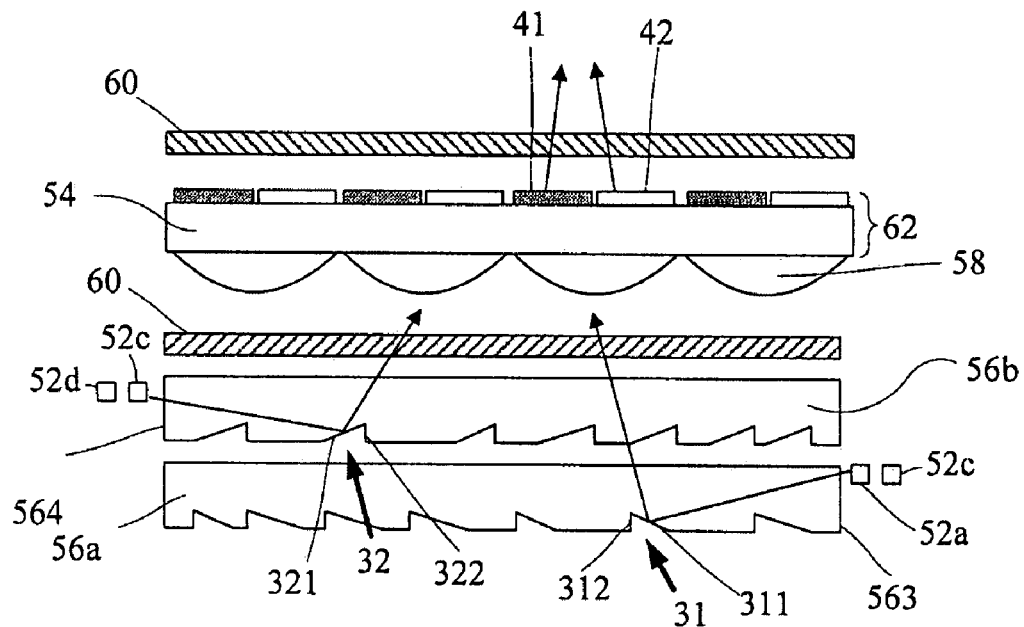
FIGS. 4A and 4B depict schematic diagrams of the operations of a liquid crystal display device according to a second embodiment of the present invention.
Figure 4B:
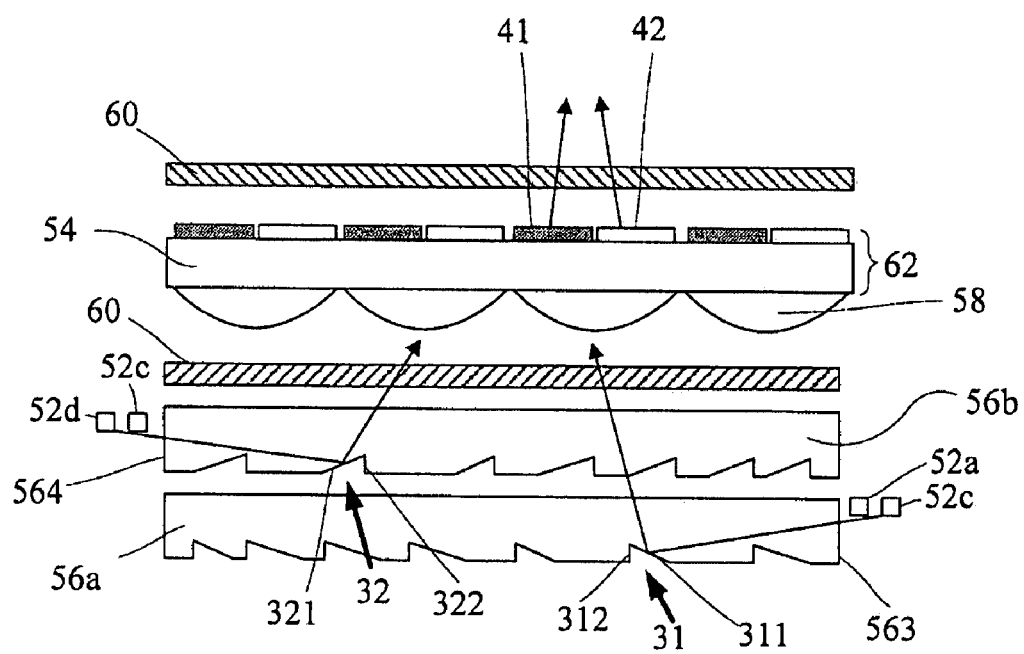

FIGS. 4A and 4B depict schematic diagrams of the operations of a liquid crystal display device according to a second embodiment of the present invention. The liquid crystal display device 200 includes a first light source 52a, a second light source 52b, a third light source 52c, a fourth light source 52d, a first light guide plate 56a, a second light guide plate 56b, two polarization films 60, a plurality of condensers 58 and a liquid crystal cell 62. The liquid crystal cell 62 includes a plurality of pixel units, each pixel unit, which contains a first sub-pixel 41 and a second sub-pixel 42, is corresponding to a condensing lens 58. The light guide plate 56a includes a first light entrance surface 563 and a second light entrance surface 564, relatively. The first and third light sources 52a,52c are disposed on one side of the first light entrance surface 563, and the second and fourth light sources 52b, 52d are disposed on one side of the second light entrance surface 564. The first light source 52a generates a light having the first wavelength range; in an embodiment according to the present invention, the first light source 52a is a red light emitting diode, and thus the light having the first wavelength range is in accordance with that having the wavelength range of red light. The second light source 52b generates a light having the second wavelength range; in an embodiment according to the present invention, the second light source 52b is a blue light emitting diode, and thus the light having the second wavelength range is in accordance with that having the wavelength range of blue light. The third light source 52c generates a light having the third wavelength range; in an embodiment according to the present invention, the third light source 52c is a green light emitting diode, and thus the light having the third wavelength range is in accordance with that having the wavelength range of green light. The fourth light source 52d generates a light having the fourth wavelength range; in an embodiment according to the present invention, the fourth light source 52d is a yellow light emitting diode, and thus the light having the fourth wavelength range is in accordance with that having the wavelength range of yellow light. In another embodiment according to the present invention, the fourth light source 52d may be a white light emitting diode, and thus the light having the fourth wavelength range is also in accordance with that having the wavelength range of white light.

The first light guide plate 56a includes a plurality of first grooves 31, and each first groove 31 contains a first reflective surface 311 and a first plane 312. A degree of the angle between the first plane 312 and the first reflective surface 311 is in the range of 15 to 45. Each second light guide plate 56b includes a plurality of second grooves 32, and each second groove 32 contains a second reflective surface 321 and a second plane 322. A degree of the angle between the second plane 322 and the second reflective surface 321 is in the range of 15 to 45. In a better embodiment, the directions of normal lines of the first reflective surface 311 and second reflective surface 321 are perpendicular to each other.

After entering the light guide plate 56, the red or green light emitted from the first or third light sources 52a,52c, respectively, may be guided to a uniform area light by the first reflective surface 311 of the first light guide plate 56a. Similarly, the blue or yellow light emitted from the second or fourth light sources 52b, 52d, may be guided to a uniform area light by the second reflective surface 321 of the second light guide plate 56b. Next, the light emitted from the light guide plate 56, after passing through the polarization film 60, is polarized then emitted into a plurality of condensing lens 58. A plurality of condensing lens 58 are used for condensing light with various colors red, blue, green and yellow, such that the red and green light may be emitted toward the first sub-pixel 41 and the blue and yellow light may be emitted toward the second sub-pixel 42.

Except that the liquid crystal device 200 configures two light guide plates 56a and 56b, the operation mechanisms of the two liquid crystal display devices 200 and 100 are similar; therefore, the emitting time of light sources 52a-52d may be referred to as FIG. 3.

Furthermore, in the embodiment mentioned above, the combination of light sources 52a-52d may be adjusted according to requirements. For example, the light sources 52a and 52c for generating red and green light, respectively, may be disposed on one side of light guide plate, and the light sources 52b and 52d for generating blue and yellow light, respectively, may be disposed on the other side thereof.

In another embodiment, the wavelength ranges generated by the light sources 52a to 52d may be adjusted by designers and not limited to the wavelength ranges of the four colors red, green, blue and yellow.

As compared to the prior art, the liquid crystal display device, according to the present invention, configures a plurality of light sources to emit light having various wavelength ranges in one scanning period, so as to resolve the problem that a conventional liquid crystal display device depends on a color filter to generate light having various wavelength ranges. In such case, a color filter is not an indispensable component anymore for a liquid crystal display device, and thus the total production cost thereof is lowered.

While the present invention has been described in connection with what is considered the most practical and preferred embodiments, it is understood that this invention is not limited to the disclosed embodiments but is intended to cover various arrangements made without departing from the scope of the broadest interpretation of the append claims.

What is claimed is:

1. A liquid crystal display device comprising:
   a plurality of pixel units comprising a first sub-pixel unit and a second sub-pixel unit;
   a first light source for generating light having a first wavelength range;
   a second light source for generating light having a second wavelength range;
   a third light source for generating light having a third wavelength range;
   a fourth light source for generating light having a fourth wavelength range;
   a light guide plate having a plurality of first grooves and a plurality of second grooves, each first groove comprising a first reflective surface for guiding the light having the first wavelength range and the light having the third wavelength range, and each second groove comprising a second reflective surface for guiding the light having the second wavelength range and the light having the fourth wavelength range; and
   a plurality of condensing lenses disposed between the light guide plate and the Plurality of pixel units, each condensing lens is adapted for condensing the light having the first wavelength range and the light having the third wavelength range on the first sub-pixel, and is adapted for condensing the light having the second wavelength range and the light having the fourth wavelength range on the second sub-pixel.

2. The liquid crystal display device of claim 1, wherein the first light source is a red light emitting diode, and the first wavelength range is consistent with the spectrum of red light.

3. The liquid crystal display device of claim 1, wherein the second light source with the blue light emitting diode, and the second wavelength range is consistent with the spectrum of blue light.

4. The liquid display device of claim 1, wherein the third light source is a green light emitting diode, and the third wavelength range is consistent with the spectrum of green light.

5. The liquid crystal display device of claim 1, wherein the forth light source is a yellow or white light emitting diode, and the fourth wavelength range is consistent with the spectrum of yellow or white light.

6. The liquid crystal display device of claim 1, wherein the light guide plate has a first light entrance surface and a second light entrance surface opposite to the first light entrance surface, the first light source and the third light source are disposed by the first light entrance surface, and the second light source and the fourth light source are disposed by the second light entrance surface.

7. The liquid crystal display device of claim 6, wherein each first groove comprises a first plane, an angle between the first plane and the first reflective surface ranges from about 15 degrees to 45 degrees.

8. The liquid crystal display device of claim 6, wherein each second each second groove comprises a second plane, an angel between the second plane and the second reflective surface ranges from about 15 degrees to 45 degrees.

9. The liquid crystal display device of claim 6, wherein a normal line of the first reflective surface is perpendicular to a normal line of the second reflective surface.

10. The liquid crystal display device of claim 1, further comprising a polarization film, disposed between the light plate and the plurality of condensing lenses, for polarizing light emitted from the light guide plate.

11. The liquid crystal display device of claim 1, wherein a period of time for turning on the first light source and the second light source is staggered to that of turning on the third light source and the fourth light source.

12. The liquid crystal display device of claim 1, wherein the first light source and the second light source are turned-on simultaneously.

13. The liquid crystal display device of claim 1, wherein the third light source and the fourth light source are turned-on simultaneously.

14. A liquid crystal display device comprising:
a plurality of pixel units comprising a first sub-pixel unit and a second sub-pixel unit;
a first light source for generating light having a first wavelength range;
a second light source for generating light having a second wavelength range;
a third light source for generating light having a third wavelength range;
a fourth light source for generating light having a fourth wavelength range;
a first light guide plate having a plurality of first grooves, each first groove comprising a first reflective surface for guiding the light having the first wavelength range and the light having the third wavelength range;
a second light guide plate having a plurality of second grooves, each second groove comprising a second reflective surface for guiding the light having the second wavelength range and the light having the fourth wavelength range; and
a plurality of condensing lenses disposed between the light guide plate and the plurality of pixel units, each condensing lens is adapted for condensing the light having the first wavelength range and the light having the third wavelength range on the first sub-pixel, and is adapted for condensing the light having the second wavelength range and the light having the fourth wavelength range on the second sub-pixel.

15. The liquid crystal display device of claim 14, wherein the first light source is a red light emitting diode, and the first wavelength range is consistent with the spectrum of red light.

16. The liquid crystal display device of claim 14, wherein the second light source is a blue light emitting diode, and the second wavelength range is consistent with the spectrum of blue light.

17. The liquid crystal display device of claim 14, wherein the third light source is a green light emitting diode, and the third wavelength range is consistent with the spectrum of green light.

18. The liquid crystal display device of claim 14, wherein the fourth light source is a yellow or white light emitting diode, and the fourth wavelength range is consistent with the spectrum of yellow or white light.

19. The liquid crystal display device of claim 14, wherein the first light guide plate has a first light entrance surface and the second light guide plate has a second light entrance surface opposite to the first light entrance surface, the first light source and the third light source are disposed by the first light entrance surface, and the second light source and the fourth light source are disposed by the second light entrance surface.

20. The liquid crystal display device of claim 19, wherein each first groove comprises a first plane, an angle between the first plane and the first reflective surface is in a range from 15 degrees to 45 degrees.

21. The liquid crystal display device of claim 19, wherein each second groove comprises a second plane, an angle between the second plane and the second reflective surface ranges from about 15 degrees to 45 degrees.

22. The liquid crystal display device of claim 19, wherein a normal line of the first reflective surface is perpendicular to a normal line of the second reflective surface.

23. The liquid crystal display device of claim 14, further comprising a polarization film, disposed between the first light guide plate and the plurality of condensing lenses, for polarizing light emitted from the light guide plate.

24. The liquid crystal display device of claim 14, wherein a period of time for turning on the first light source and the second light source is staggered to that of turning on the third light source and the fourth light source.

25. The liquid crystal display device of claim 14, wherein the first light source and the second light source are turned-on simultaneously.

26. The liquid crystal display device of claim 14, wherein the third light source and the fourth light source are turned-on simultaneously.

* * * * *